United States Patent

Takeshita et al.

[11] 3,834,362
[45] Sept. 10, 1974

[54] METHOD AND DEVICE FOR CONTROLLING FUEL INJECTION

[75] Inventors: Tomon Takeshita; Shigetsugu Ozaki, both of Nagoya, Japan

[73] Assignee: Kabushiki Kaisha Toyota Chuo Kenkyusho, Aichi-ken, Japan

[22] Filed: Oct. 27, 1972

[21] Appl. No.: 301,274

[30] Foreign Application Priority Data
Oct. 30, 1971 Japan.............................. 46-86586

[52] U.S. Cl........................ 123/32 EA, 123/119 R
[51] Int. Cl............................................. F02b 3/00
[58] Field of Search..................... 23/32 EA, 32 AC

[56] References Cited
UNITED STATES PATENTS

| | | | |
|---|---|---|---|
| 3,500,801 | 3/1970 | Long | 123/32 EA |
| 3,548,791 | 12/1970 | Long | 123/32 EA |
| 3,612,011 | 10/1971 | Monpetit | 123/32 EA |
| 3,737,681 | 6/1973 | Rothermel | 123/32 EA |

*Primary Examiner*—Laurence M. Goodridge
*Assistant Examiner*—Ronald B. Cox

[57] ABSTRACT

Method and device for controlling fuel injection in a multi-cylinder spark-ignition engine, wherein the fuel injection preparation signals are sequentially produced from the ignition signals generated for all of the cylinders and the ignition signal applied to a certain cylinder, and are applied to devices for actuating the fuel injection valve of the cylinders in the same order as that of the ignition. Signals produced by the ignition signals are delayed for a predetermined time depending upon the engine speed and load and said delayed signals are applied to said devices to which said preparation signals are applied, so that the fuel is injected into cylinders in the same order as that of the ignition and at the appropriate time.

11 Claims, 9 Drawing Figures

| CYLINDER | ───→ STROKES | | | |
|---|---|---|---|---|
| No. 1 | COMPRESSION | EXPANSION | EXHAUST | INTAKE |
| No. 3 | INTAKE | COMPRESSION | EXPANSION | EXHAUST |
| No. 4 | EXHAUST | INTAKE | COMPRESSION | EXPANSION |
| No. 2 | EXPANSION | EXHAUST | INTAKE | COMPRESSION |

METHOD AND DEVICE FOR CONTROLLING FUEL INJECTION

BACKGROUND OF THE INVENTION

The present invention relates to a method and device for electrically controlling fuel injection in internal combustion engine which may generate the signals for starting the fuel injection for each cylinder at the appropriate time in a simple manner.

The conventional electrical fuel injection device provided with a fuel injection nozzle for each cylinder generates the electric signal in synchronism with the engine speed at the proper instant during the piston stroke, and shapes and amplifies the electric signal so as to conduct the electric current through a solenoid coil of an fuel injection valve, open the fuel injection valve and inject the fuel from the injection hole of the nozzle into the cylinder.

SUMMARY OF THE INVENTION

According to the present invention, in a multi-cylinder spark-ignition engine, the fuel injection preparation signals are sequentially produced from the ignition signals of the cylinders and those of a certain cylinder, and applied to the devices for actuating the fuel injection valve of the cylinders in the same order as that of the ignition. Signals produced by the ignition signals are delayed for a predetermined time depending upon the engine speed and load. The delayed signals are applied to said devices to which said preparation signals are applied, so that the fuel is injected into cylinders in the same order as that of the ignition and at the appropriate time.

The amount of the fuel to be injected into the cylinder is controlled by changing the width of the signal, that is the time interval of the current flowing through the solenoid coil by a wave-shaping circuit. In multi-cylinder engines, a number of the fuel injection valves equal to that of the cylinders is provided and each valve is actuated independently of each other, so that the fuel-injection-start signals must be generated independently to each valve.

Further, the prior art device of the type described above has the disadvantages as follows.

In order to generate the above electric signal, the prior art device must be provided with mechanical contacts. Therefore the number of contacts is at least equal to that of cylinders. Thus the space for installing the device is limited and it is very difficult to maintain and adjust said contacts. Further, it is necessary to design a different type of device according to the types of the four-cycle four-cylinder reciprocating engine.

According to the present invention, no mechanical contact is used so that the fuel injection device of the present invention may be applied to all types of engines only by changing the electrical setting. The device for controlling fuel injection, in accordance with the present invention, may be applied not only to a four-cycle four-cylinder reciprocating engine, but also to all of spark-ignition engines such as two-, six-, eight-, and 12-cylinder engines and rotary engines.

The above and other objects, features and advantages of the present invention will become more apparent from the following description of the preferred embodiments thereof taken in conjunction with the accompanying drawings.

DESCRIPTION OF PREFERRED EMBODIMENTS

Figure 1:
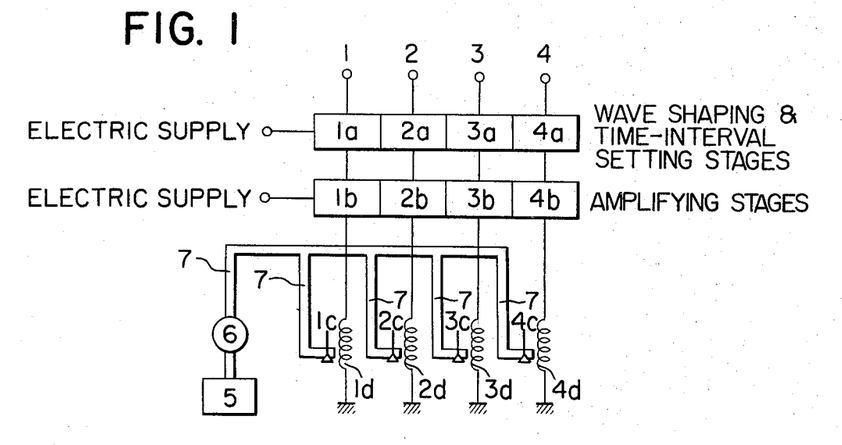
FIGS. 1 and 2 are diagrams of the prior art device for controlling fuel injection.
Figure 2:
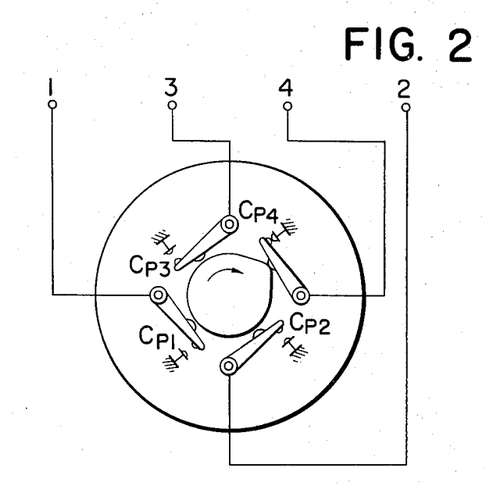

FIG. 1 is a diagram of the device for controlling fuel injection provided with an injection valve in each cylinder of a four-cylinder engine. The signals are applied from terminals 1, 2, 3 and 4 through the wave-shaping and time-interval setting stages 1a – 4a and in amplifying stages 1b – 4b to injection nozzles 1c – 4c. Reference numeral 5 denotes a fuel tank; 6, a fuel pump for supplying the fuel from the fuel tank 5 so as to supply the fuel injection nozzles 1c – 4c with the fuel under pressure through fuel pipes 7; and 7, said fuel pipes. The positive or negative injection signals are applied to the terminals 1 – 4 respectively depending upon the construction of the waveshaping and time-interval setting stages 1a – 4a. Alternatively, the input terminals 1 – 4 may be grounded. The usual fuel injection order of the four-cylinder engine is 1, 3, 4, 2 or 1, 2, 4, 3 in the cylinder number. The signals must be applied in the order named to the terminals 1 – 4. The input signals to be applied to the terminals 1 – 4 are generated by a mechanism of the type shown in FIG. 2. That is, a cam $Cu$, which rotates at a rotational speed equal to one-half of that of a crankshaft, closes contacts $C_{p1} - C_{p4}$, thereby generating the input signals to be applied to the terminals 1 – 4. In the mechanism shown in FIG. 2, the contacts $C_{p1} - C_{p4}$ are closed in the order of $C_{p1}$, $C_{p3}$, $C_{p4}$ and $C_{p2}$. The mechanism shown in FIG. 2 has a construction similar to an ignition contact-breaker of an ignition plug, and is so mounted as to rotate simultaneously with the camshaft.

According to the present invention, the above and other objectionable features and problems encountered in the prior art devices may be overcome as will become more apparent from the following description.

Figure 3:
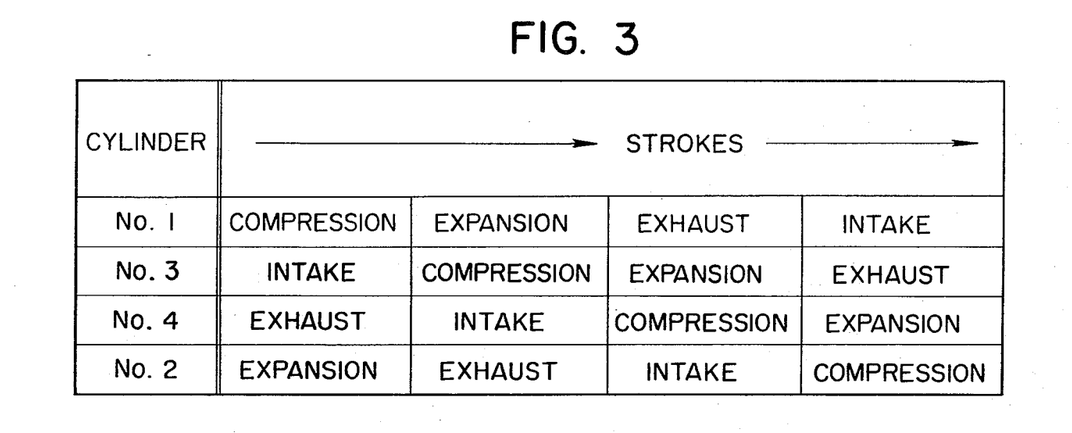
FIG. 3 is a table showing the firing order of the four-cycle four-cylinder engine.

One of the most important novel features of the present invention resides in the fact that the fuel injection is effected not by the special injection-start signals but the signals generated when the contacts of the contact-breaker in the spark-ignition circuit are closed and that both the voltage so current used in the spark-ignition system are also used in the device for controlling the fuel injection. The preferred embodiments of the present invention will be explained in accordance with a four-cycle four-cylinder engine in which the fuel is injected into the intake port of the cylinder during the intake stroke and the ignitions of the cylinders are effected in order of 1, 3, 4, 2. The cycle of each cylinder is shown in FIG. 3, and the fuel injection is effected during the intake stroke. In general, the ignition occurs in a certain cylinder immediately before the induction stroke is started in one of the other three remaining cylinders. For example, the ignition in the cylinder No. 4 occurs immediately before the intake stroke is started in the No. 1 cylinder.

Figure 4:
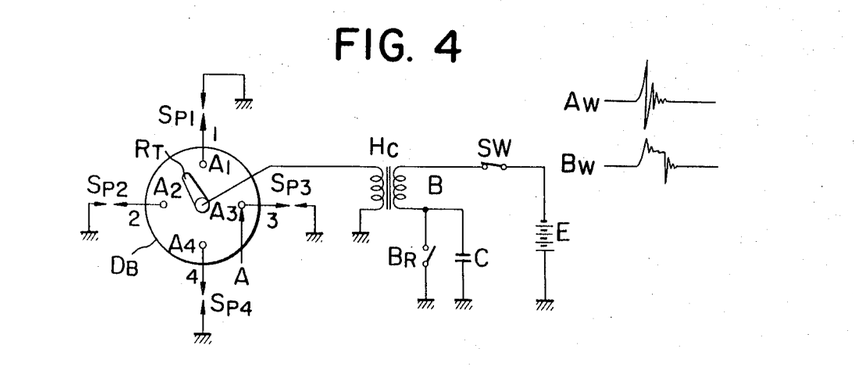
FIG. 4 is a diagram of an ignition circuit for the four-cylinder engine.

In an ignition circuit shown in FIG. 4, at the instant when a breaker $B_R$ is closed by a quadrate cam (not shown), a high-voltage current flows from an ignition coil $H_c$ to a distributor $D_B$. As a rotor $R_T$ rotates, the high voltage current is supplied to the appropriate spark plugs $S_{p1} - S_{p4}$ through the contacts $A_1 - A_4$. SW denotes an ignition switch; E, a storage battery; and C, a capacitor. The cam (not shown) is directly connected to the distributor rotor $R_T$ so that the latter may rotate at a rotational speed equal to one half of that of the crankshaft. Between the point B and the ground, the electric signal of the waveform $B_W$ is generated four times for every two rotations of the crankshaft. At the point A, the electric signal of the waveform $A_W$ is generated once for every two rotations of the crankshaft. According to the present invention, the fuel injection start signals are obtained from the above electric signals.

Figure 5A:
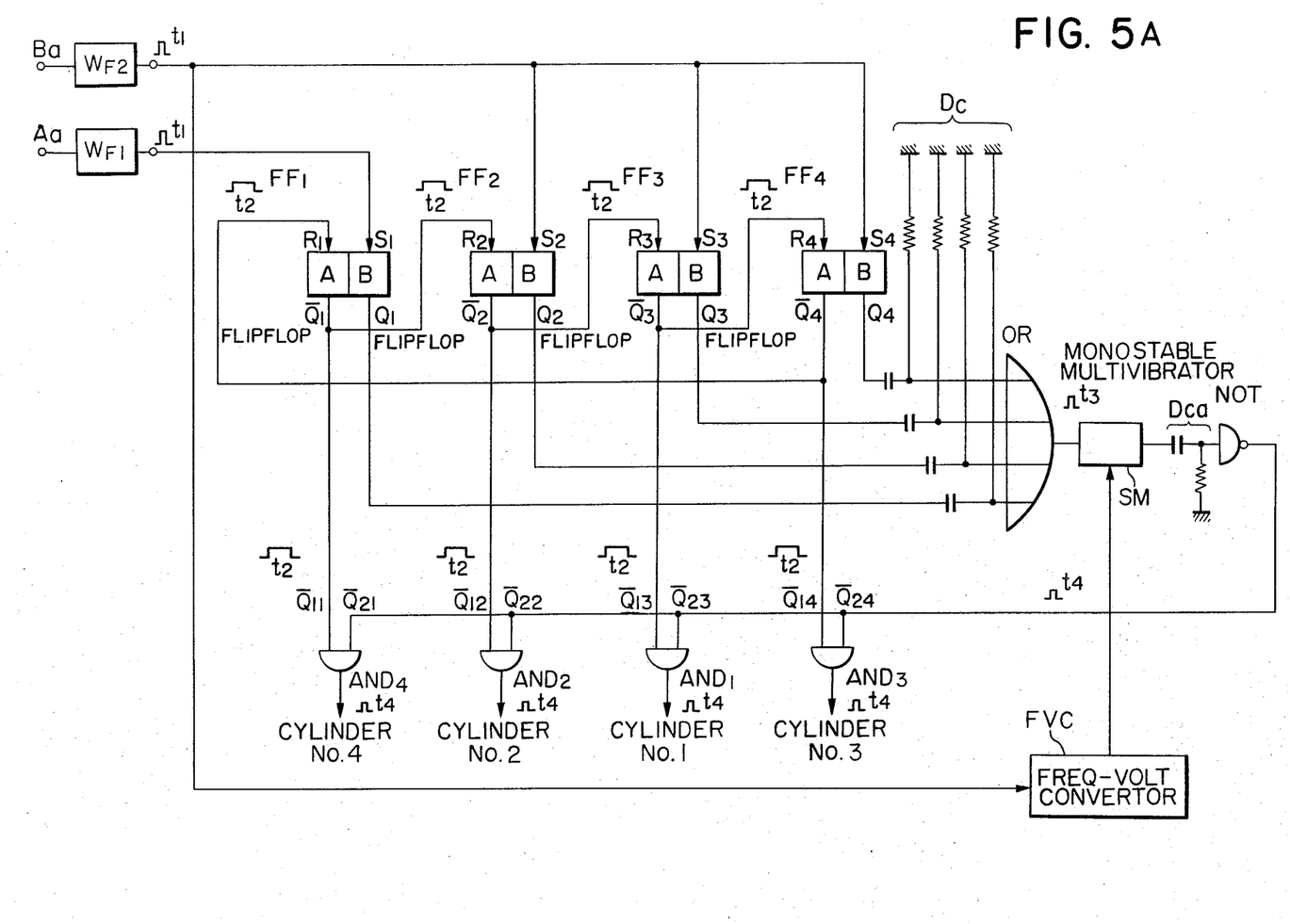
FIG. 5A and FIG. 5B are block diagrams of a first and second embodiments of the present invention respectively.

FIG. 5A is a block diagram of a first embodiment of a device for controlling fuel injection in accordance with the present invention. This device, utilizing the principle that the ignition is effected in a certain cylinder immediately before the injection is started into another cylinder, converts the ignition signal into the fuel injection starting signal by delaying the signal produced by the ignition signal for a predetermined time or angle through a delay circuit. This embodiment of the present invention is applied to a four-cycle four-cylinder engine. The device of this embodiment is provided with a first wave-shaping circuit $W_{F1}$, the input terminal $A_a$ of which is connected to the contact $A_3$, that is point A of the distributor $D_B$ shown in FIG. 4, for generating a rectangular waveform, and a second wave-shaping circuit $W_{F2}$, the input terminal $B_a$ of which is connected to the primary side of the ignition coil $H_c$, that is point B shown in FIG. 4, for generating a rectangular waveform. The fuel injection control device further comprises four flip-flops $FF_1$, $FF_2$, $FF_3$ and $FF_4$ provided with set and reset input terminals and a first and second output terminals. The first output terminal $\overline{Q}_1$ of the first flip-flop $FF_1$ is connected to the reset input terminal $R_2$ of the second flip-flop $FF_2$ of which first output terminal $\overline{Q}_2$ is connected to the reset input terminal $R_3$ of the third flip-flop $FF_3$. The first output terminal $\overline{Q}_3$ of the third flip-flop $FF_4$ of which first output terminal $\overline{Q}_4$ is connected to the reset input terminal $R_1$ of the first flip-flop $FF_1$. Thus, a ring counter is provided.

The device further comprises four differentiation circuits $D_c$ and a delay circuit consisting of an OR gate circuit OR, a monostable multivibrator SM for controlling a time delay, a differentiation circuit $D_{ca}$ and a NOT gate circuit NOT, and four AND gate circuits $AND_1$, $AND_2$, $AND_3$ and $AND_4$.

The input terminals of the four differentiation circuit $D_c$ are connected to the second output terminals $Q_1 \sim Q_4$ respectively of the flip-flop $FF_1 - FF_4$. Four input terminals of the OR gate circuit OR are connected to output terminals of the four differentiation circuit $D_c$.

The input terminal of the monostable multivibrator is connected to the output terminal of the OR gate circuit OR and the control terminal of the monostable multivibrator is connected through a frequency-voltage converter FVC to the output terminal of the second wave shaping circuit $W_{F2}$.

The input terminal of the differentiation circuit $D_{ca}$ is connected to the output terminal of the monostable multivibrator and the input terminal of the NOT gate circuit NOT is connected to the output terminal of the differentiation circuit $D_{ca}$.

The first input terminals $\overline{Q}_{11}$, $\overline{Q}_{12}$, $\overline{Q}_{13}$ and $\overline{Q}_{14}$ of the AND gate circuits $AND_1$, $AND_2$, $AND_3$ and $AND_4$ are connected to first output terminals $\overline{Q}_1$, $\overline{Q}_2$, $\overline{Q}_3$ and $\overline{Q}_4$ of the flip-flop circuits $FF_1$, $FF_2$, $FF_3$ and $FF_4$ respectively. The second input terminals $\overline{Q}_{21}$, $\overline{Q}_{22}$, $\overline{Q}_{23}$ and $\overline{Q}_{24}$ of the AND gate circuits $AND_1$, $AND_2$, $AND_3$ and $AND_4$ are connected to the output terminal of the NOT gate circuit NOT and the output terminals of the AND gate circuits $AND_1$, $AND_2$, $AND_3$ and $AND_4$ are connected to the devices for actuating the fuel injection valves.

The electric signal $A_w$ for effecting the ignition in the cylinder No. 3 generated at the contact $A_3$ of the distributor $D_B$ is applied to the first wave-shaping circuit $W_{F1}$ so as to be shaped into the rectangular wave form signal having the width $t_1$. This signal is then applied to the set input terminal $S_1$ of the first flip-flop $FF_1$.

Figure 6A:
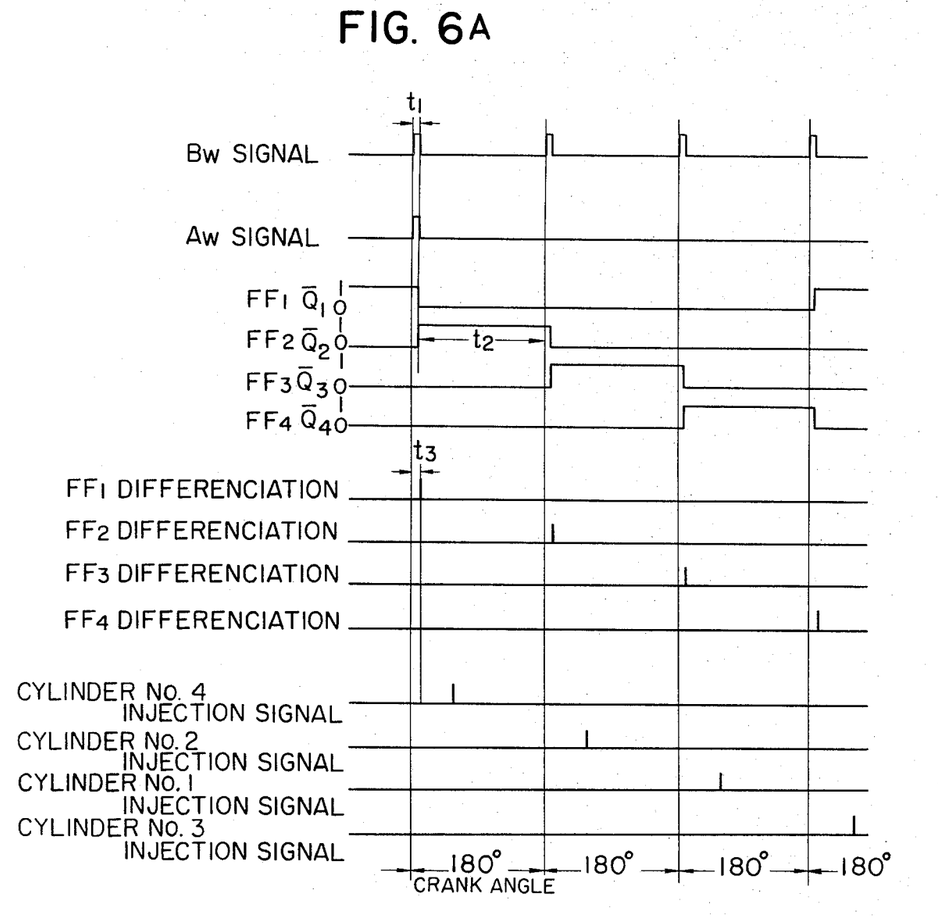
FIG. 6A and FIG. 6B are timing charts of signals used in the first embodiment.
Figure 6B:
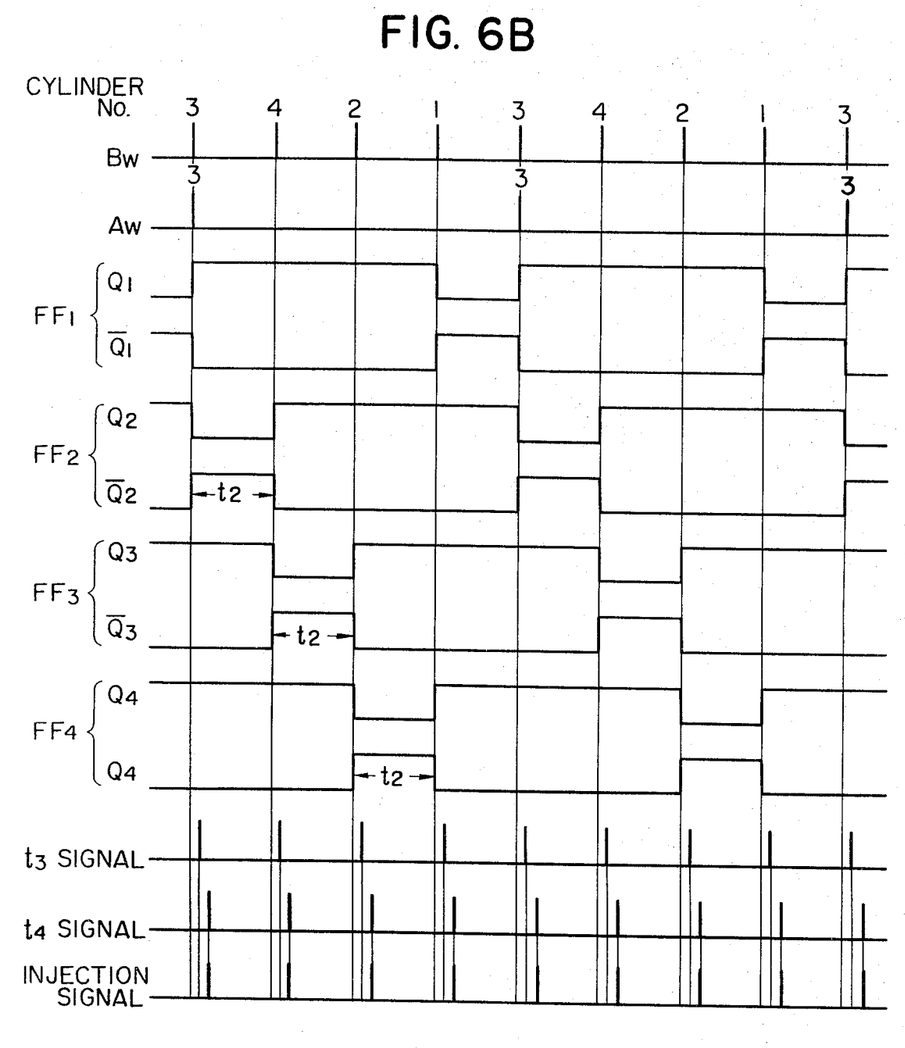

When the flip-flop $FF_1$ receives the rectangular waveform signal $A_w$ from the set input terminal $S_1$ the flip-flop $FF_1$ applies the rectangular waveform signal "1" as the signal $FF_1Q_1$ shown in FIG. 6B from the output terminal $Q_1$ to the differentiation circuit $D_c$, and the flip-flop $FF_1$ applies the rectangular waveform signal "0" from the output terminal $\overline{Q}_1$ to the AND gate cicuit $AND_4$ and the flip-flop circuit $FF_2$. The differentiation circuit $D_c$ applies the rectangular waveform signal having the pulse width $t_3$ to the OR gate circuit OR at the time when the rectangular waveform signal applied from the output terminal $Q_1$ of the flip-flop $FF_1$ is changed from "0" to "1."

The delay circuit consisting of the OR gate circuit OR, of monostable multivibrator SM, the differentiation circuit $D_{ca}$ and the NOT gate circuit NOT, delays said rectangular waveform signal having the pulse width $t_3$ for a predetermined time depending upon the engine speed and load, and then applies the rectangular waveform signal having the pulse width $t_4$ to the AND gate circuits $AND_1 - AND_4$.

When the reset input terminal $R_2$ of the flip-flop $FF_2$ receives the rectangular waveform signal "0" from the output terminal $\overline{Q}_1$ of said flip-flop $FF_1$, the flip-flop $FF_2$ applies the rectangular waveform signal "1" from the output terminal $\overline{Q}_2$ to said differentiation circuit $D_c$, and the flip-flop $FF_2$ applies from the output terminal $\overline{Q}_2$, the rectangular waveform signal "1" as the signal $FF_2\overline{Q}_2$ shown in FIGS. 6A and 6B to the AND gate circuit $AND_2$ and the flip-flop $FF_3$.

Thus, when the NOT gate circuit NOT applies the signal having the pulse width $t_4$ to the AND gate circuits $AND_1 - AND_4$, only the AND gate circuit $AND_2$ which receives the signal from the output terminal $\overline{Q}_2$ of the flip-flop $FF_2$, receives said signal from the NOT gate circuit NOT, and only the device for actuating the fuel injection valve connected to the AND gate circuit $AND_2$ operates to inject the fuel into the second cylinder.

The electric signal $B_W$ generated at the primary side of the ignition coil $H_c$ is then applied to the second wave-shaping circuit $W_{F2}$ so as to be shaped into the rectangular waveform signal having the pulse width $t_1$.

This signal is applied to the set input terminal $S_2$, $S_3$ and $S_4$ of the flip-flop $FF_2$, $FF_3$, and $FF_4$. At this time, only the flip-flop $FF_2$ is being reset, receiving the signal applied from the output terminal $\overline{Q_1}$ of the flip-flop $FF_1$. Thus, at this time only the flip-flop $FF_2$ is operated to apply the rectangular waveform signal "1" from the output terminal $Q_2$ to the differentiation circuit $D_c$, and to apply the rectangular waveform signal "0" as the signal $FF_2\overline{Q_2}$ in FIGS. 6A and 6B from the output terminal $\overline{Q_2}$ to the flip-flop circuit $FF_2$ and the AND gate circuit $AND_2$. In the same manner as described above, the differentiation circuit $D_c$ applies the rectangular waveform signal having the pulse width $t_3$ at the time when the rectangular waveform signal applied from the flip-flop $FF_2$ through the output terminal $Q_2$ is changed from "0" to "1," and the delay circuit applies the rectangular waveform signal having the pulse width $t_4$ to the AND gate circuits $AND_1 - AND_4$.

Receiving the signal "0" from the flip-flop $FF_2$ through the output terminal $\overline{Q_2}$, the flip-flop $FF_3$ applies the rectangular signal "1" through the output terminal $\overline{Q_3}$ to the AND gate circuit $AND_1$.

Thus, only the AND gate circuit $AND_1$ receives the signals in the "1" state from the input terminals $\overline{Q_{13}}$ and $\overline{Q_{23}}$ thereof and applies the rectangular waveform signal to the device for actuating the injection valve to inject the fuel into the first cylinder.

In the manner described above, each flip-flop is reset respectively by receiving the signal applied from the output terminal $\overline{Q}$ of the last flip-flop. The reset flip-flop applies the signal "1" from the output terminal $\overline{Q}$ to the AND gate circuit AND corresponding to said flip-flop. Upon next flip-flop FF, and then receiving the ignition signal $B_W$ from the set input terminal S, the reset flip-flop applies the rectangular waveform signal "1" from the output terminal Q to the differentiation circuit $D_c$. Thus, in proper order the AND gate circuit corresponding to said flip-flop is operated respectively to make the corresponding device for actuating the injection of the predetermined amount of fuel into the corresponding cylinder.

If the flip-flop $FF_1$ is reset receiving the electric signal applied from the wave-shaping circuit $W_{F1}$ when the device for controlling the fuel injection is started, the device operates in the manner described above. However, if the flip-flop $FF_2$ is reset when the device for controlling the fuel injection is started, the signal $B_W$ is continuously applied to the flip-flop circuits $FF_2$, $FF_3$ and $FF_4$ through the second wave-shaping circuit $W_{F2}$ from the primary side of the ignition coil $H_c$, and second flip-flop $FF_2$ operates to apply the signal from the first output terminal $\overline{Q_2}$ thereof to the reset input terminal $R_3$ of the third flip-flop $FF_3$ so that the latter is reset. In a manner similar to that described above, the fourth flip-flop $FF_4$ and the first flip-flop $FF_1$ are sequentially reset. The first flip-flop $FF_1$ remains in a reset state until the signal $A_w$ for the third cylinder is applied to the set input terminal $S_1$ of the first flip-flop $FF_1$ through the first wave-shaping circuit $W_{F1}$ from the contact $A_3$ for the third cylinder in the distributor $D_B$. In other words, the flip-flop $FF_1$ is reset when the signal $A_w$ is applied to the input terminal $S_1$. In a similar manner the flip-flops $FF_2$, $FF_3$ and $FF_4$ are reset in order. The signal $B_W$ appears four times for every two rotations of the crankshaft of the four-cycle four-cylinder engine. It is not known, however, which of the four signals $B_W$ corresponds to a specific cylinder. According to the present invention, this problem may be overcome by distributing each of the four signals $B_W$ to each of the four cylinders through the ring counter comprising the four flip-flops which are disposed in the ignition order of the cylinders and are actuated in response to the signal $A_w$. The ignition occurs when the crankshaft rotates to 10 degree before the dead center and the fuel injection is started after the crankshaft rotates 10° from the dead center. Therefore, as is apparent from FIG. 3 the difference in degree between the ignition of the fourth cylinder and the fuel injection into the second cylinder is 20° (crank angle). However, even though the difference in terms of degree (crank angle) is constant, the difference in terms of time changes as the engine speed changes. To overcome this problem, according to the present invention, the number of the signals $B_W$ per unit time, that is, the frequency is detected. This frequency is converted into a voltage in response to which the monostable multivibrator SM controls the time delay, thereby determining the injection time. FIGS. 6A and 6B show the detailed timing charts of the each signal, respectively.

Figure 5B:
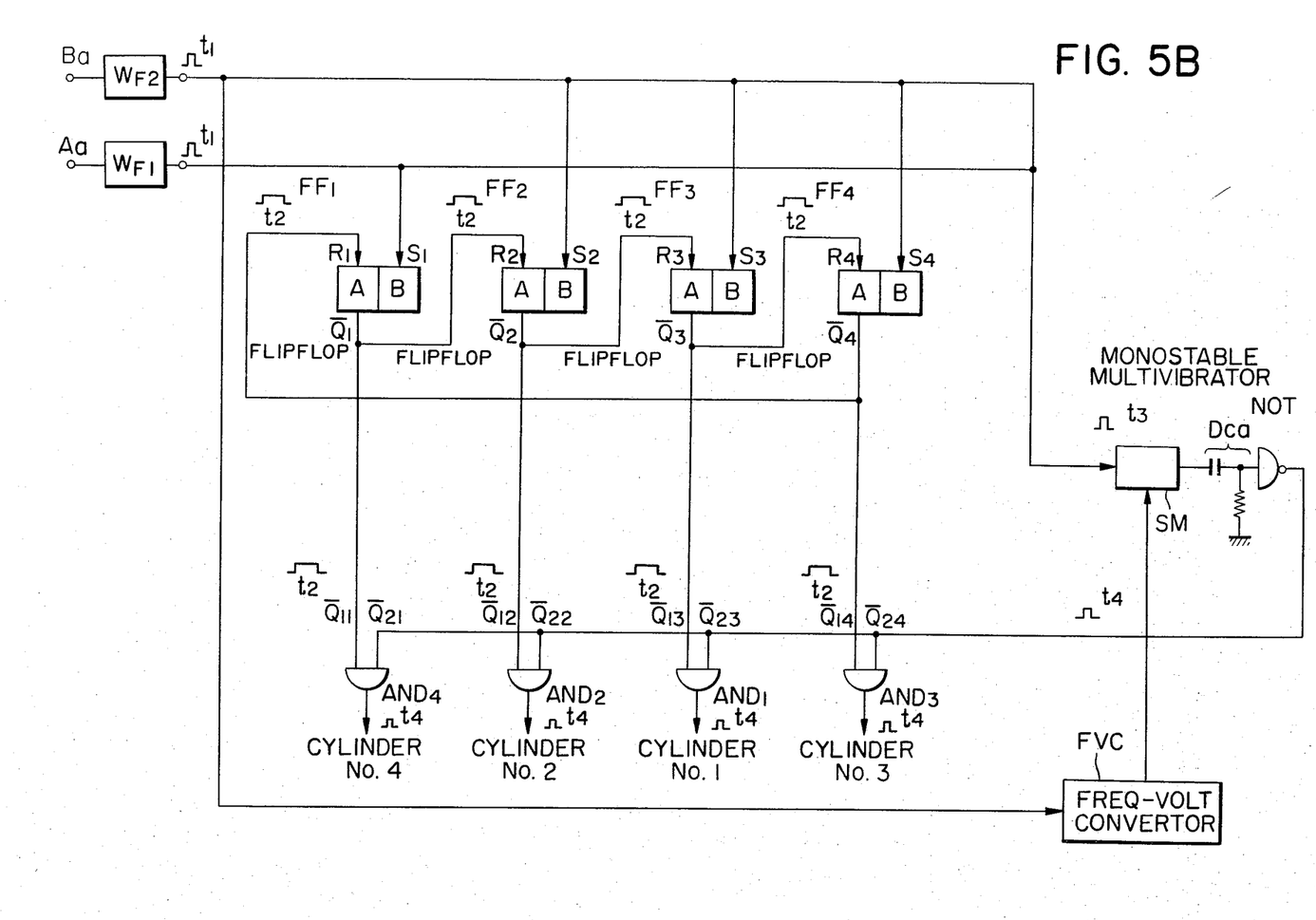

In the embodiment shown in FIG. 5B, the input terminal of the monostable multivibrator SM is connected to the output terminals Q of the flip-flops $FF_1 - FF_4$ through the differentiation circuit. In addition to the above, by connecting the input terminal of the monostable multivibrator directly to the wave-shaping circuit $W_{F2}$, the same effect can be obtained (See FIG. 5B).

Further, the device, in which the monostable multivibrator and the wave-shaping circuit $W_{F2}$ are connected directly, can be produced at low cost because the circuit is a very simple one.

Figure 7:
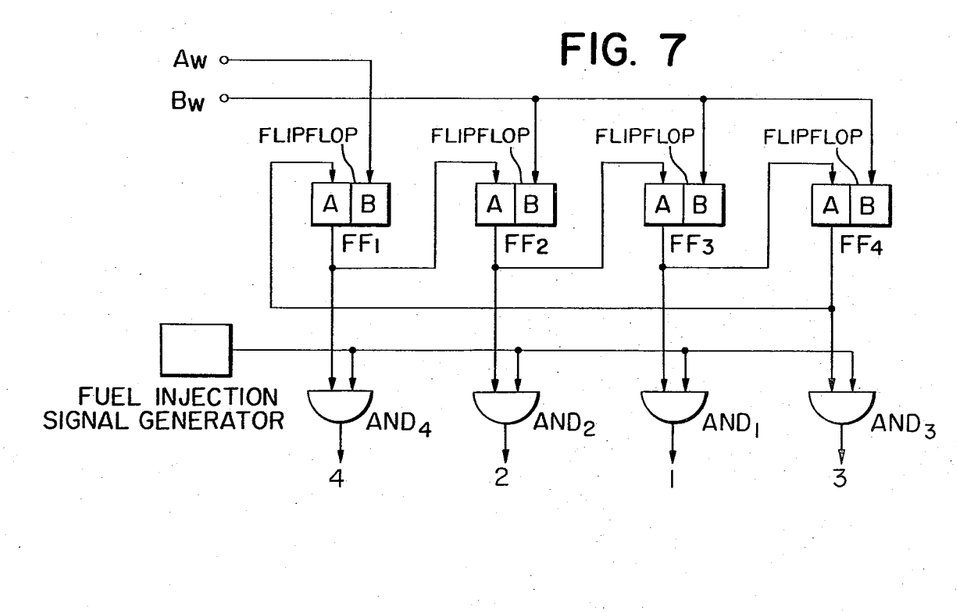
FIG. 7 is a block diagram of a third embodiment of the present invention.

FIG. 7 is a block diagram of the third embodiment of the present invention. The construction of the second embodiment is simple because only the ring counter described with reference to FIG. 5 is used to control the fuel injection. There may be provided a suitable device such as a contact-breaker or photoelectric converter so that the pulse signals as injection signals may be correctly generated two times for every one rotation of the crankshaft. The same function and effects as those of the first embodiment described with reference to FIG. 5 can be obtained.

What is claimed is:

1. A fuel injection control method for a multi-cylinder spark-ignition engine comprising the steps of a. applying the ignition signal applied to a predetermined cylinder to one input terminal of one of a plurality of flip-flops which is equal in number to the cylinders of said engine and is interconnected to form a ring counter,
 b. applying the ignition signals of the other cylinders to corresponding first input terminals of the other flip-flops in said ring counter,
 c. applying the output signal of the preceding flip-flop to a second input terminal of each of said plurality of flip-flops,
 d. causing the succeeding flip-flop to provide the output for the fuel injection in response to the ignition signal for each cylinder, and
 e. applying to all cylinders the fuel injection signal which is delayed in time depending upon the engine speed with respect to said ignition signal, thereby injecting the fuel sequentially into the cylinders which correspond to the outputs of said succeeding flip-flops respectively.

2. A fuel injection control device for a multi-cylinder spark-ignition engine comprising
   a. a ring counter comprising a plurality of flip-flops equal in number to the cylinders;
   b. means for applying the ignition signal for a predetermined cylinder to a first input terminal of one of said plurality of flip-flops of said ring counter;
   c. means for applying the ignition signals for the other cylinders to corresponding first input terminals of the other flip-flops of said ring counter;
   d. means for causing the flip-flop next to the flip-flop which has received the ignition signal to provide a signal for fuel injection preparation in response to the generation of the ignition signal for each cylinder;
   e. means for delaying the application of fuel injection signals to the fuel injection devices of all of the cylinders for a predetermined time with respect to said ignition signal depending upon the engine speed; and
   f. means for injecting the fuel into the cylinder to which are applied both said fuel injection preparation signal and said fuel injection signal.

3. A fuel injection control device as defined in claim 2 wherein said means for applying the ignition signal for a predetermined cylinder to a first input terminal of one of said plurality of flip-flops of said ring counter comprises a wave-shaping circuit whose input terminal is connected to a contact of said predetermined cylinder in a distributor and which forms a rectangular waveform signal;
and wherein
said means for applying the ignition signals to the first input terminal of the other flip-flops of said ring counter comprises a wave-shaping circuit whose input terminal is connected to the primary of an ignition coil and which forms a rectangular waveform signal.

4. A fuel injection control device as defined in claim 2 wherein said fuel injection signal generating means comprises a contact breaker which generates the pulse signals.

5. A fuel injection control device as defined in claim 2 wherein said fuel injection signal generating means comprises a photoelectric converter which generates the pulse signals.

6. A fuel injection control device as defined in claim 2 wherein said means for delaying the fuel injection signal comprises
   a. a plurality of differentiation circuits equal in number to the cylinders and having input terminals connected to the output terminals of said plurality of flip-flops respectively,
   b. an OR gate means having an input terminal connected to the output terminals of said plurality of differentiation circuits,
   c. a monostable multivibrator having a first input terminal is connected to the output terminal of said OR gate means and having a second input terminal connected through a frequency-voltage converter to a wave-shaping circuit which in turn is connected to the primary of said ignition coil and which is adapted to adjust the time delay of the output signal,
   d. a second differentiation circuit whose input terminal is connected to the output terminal of said monostable multivibrator, and
   e. a NOT circuit whose input terminal is connected to said second differentiation circuit and whose output terminal is connected to a fuel injection device for each cylinder.

7. A fuel injection control device as defined in claim 2 wherein said means for actuating said fuel injection device in response to both said fuel injection preparation signal and said fuel injection signal comprises an AND circuit.

8. A fuel injection control device as defined in claim 2, wherein
   a. said means for applying the fuel injection signal to the fuel injection devices of all of the cylinders comprises a contact braker which generates the pulse signal, and
   b. said means for actuating said fuel injection device in response to both said fuel injection preparation signal and said fuel injection signal comprises an AND circuit.

9. A fuel injection control device as defined in claim 2, wherein
   a. said means for applying the ignition signal for a predetermined cylinder to one input terminals of one of said plurality of flip-flops of said ring counter comprises a wave-shaping circuit whose input terminal is connected to a contact of said predetermined cylinder in a distributor and which forms a rectangular wave form signal,
   b. said means for applying the ignition signals to a first input terminal of the other flip-flops of said ring counter comprises a wave-shaping circuit whose input terminal is connected to the primary of an ignition coil and which forms a rectangular waveform signal,
   c. said means for delaying the fuel injection signal comprises
      a monostable multivibrator having a first input terminal connected to the output terminal of said OR gate means and a second input terminal connected through a frequency-voltage converter to a wave-shaping circuit which in turn is connected to the primary of said ignition coil and which is adapted to adjust the time delay of the output signal,
      a differentiation circuit whose input terminal is connected to the output terminal of said monostable multivibrator,
      a NOT circuit whose input terminal is connected to said second mentioned differentiation circuit and whose output terminal is connected to a fuel injection device for each cylinder, and
   d. said means for actuating said fuel injection device in response to both said fuel injection preparation signal and said fuel injection signal comprises an AND circuit.

10. A fuel injection control device as defined in claim 2, wherein
   a. said means for applying the ignition signal for a predetermined cylinder to a first input terminal of one of said plurality of flip-flops of said ring counter comprises a wave-shaping circuit whose input terminal is connected to a contact of said predetermined cylinder in a distributor and which forms a rectangular waveform signal, b. said means for applying the ignition signals to corresponding first input terminals of the other flip-flops of said ring counter comprises a wave-shaping circuit whose input terminal is connected to the primary of an ignition coil and which forms a rectangular waveform signal, c. said means for delaying the fuel injection signal comprises a plurality of differentiation circuits equal in number to the cylinders having their input terminals connected to the output terminals of said plurality of flip-flops respectively, an OR gate means having its input terminal connected to the output terminals of said plurality of differentiation circuits, a monostable multivibrator having a first input terminal connected to the output terminal of said OR gate means and having a second input terminal connected through a frequency-voltage converter to a wave-shaping circuit which in turn is connected to the primary of said ignition coil and which is adapted to adjust the time delay of the output signal, a differentiation circuit whose input terminal is connected to the output terminal of said monostable multivibrator, a NOT circuit whose input terminal is connected to said second mentioned differentiation circuit and whose output terminal is connected to a fuel injection device for each cylinder, and d. said means for actuating said fuel injection device in response to both said fuel injection preparation signal and said fuel injection signal comprises an AND circuit.

11. A fuel injection control device as defined in claim 2, wherein said means for applying the fuel injection signal to the fuel injection devices of all the cylinders comprises a photoelectric converter for generating the pulse signal, and said means for actuating said fuel injection device in response to both said fuel injection preparation signal and said fuel injection signal comprises an AND circuit.

* * * * *

UNITED STATES PATENT OFFICE
CERTIFICATE OF CORRECTION

Patent No. 3,834,362    Dated September 10, 1974

Inventor(s) TOMON TAKESHITA and SHIGETSUGU OZAKI

It is certified that error appears in the above-identified patent and that said Letters Patent are hereby corrected as shown below:

Column 1, line 7, before "internal" add -- an --;

line 49, before "the" add -- , --;

Column 2, line 56, change "and" to -- so --;

line 57, change "so" to -- and --.

Column 5, line 33, change ". Upon" to -- and the --;

change ", and then" to -- . Upon --;

line 42, before "receiving" add -- , --.

Signed and sealed this 11th day of February 1975.

(SEAL)
Attest:

RUTH C. MASON
Attesting Officer

C. MARSHALL DANN
Commissioner of Patents
and Trademarks